United States Patent Office 3,054,766
Patented Sept. 18, 1962

3,054,766
RESINOUS COMPOSITIONS PLASTICIZED WITH NITROALKYLARENES
John O. Van Hook, Abington, Pa., assignor to Rohm & Haas Company, Philadelphia, Pa., a corporation of Delaware
No Drawing. Filed Oct. 27, 1959, Ser. No. 848,924
9 Claims. (Cl. 260—32.4)

This invention relates to nitroalkylarenes and the polyvinyl halide resinous compositions plasticized therewith.

Plasticized polyvinyl halide resins must be made today to fully meet the modern and exacting conditions to which they are subjected. In the field of flooring applications, a number of problems are encountered which no polyvinyl halide resin plasticized with a single plasticizer has been able to totally overcome. Plasticizers used for polyvinyl halide resins designed for flooring should be of intermediate softness, free of excessive brittleness, and of undesirable pliability. Another important feature is that the polyvinyl chloride resin must be resistant to extraction by aqueous soapy and detergent cleaning agents to which flooring is repeatedly exposed. Additionally, it is necessary that loss of plasticizer be kept at a minimum at the elevated temperatures encountered during processing. Moreover, the plasticizer must be economical to manufacture. These requirements have only been approached, but not yet met, by a number of plasticizers, typical of which are butyl benzyl phthalate, and di(2-ethylhexyl)phthalate, the latter being the least economical of the two.

In contrast, the nitroalkylarenes used in the invention yield polyvinyl chloride resins having the proper softness, low volatility during the heat of processing, and excellent resistance to soapy water. This desirable combination of properties makes these polyvinyl chloride resins especially well-suited for, though not limited to, flooring applications.

The polyvinyl halide resin compositions of the invention are plasticized with nitroarenes that may be designated by the followng Formula I:

$$A(NO_2)R^1R^2R^3$$

in which

A is an aryl group preferably containing from 6 to 12 carbon atoms, $R^1$ is an alkyl group preferably containing from 8 to 19 carbon atoms, $R^2$ is an alkyl group, preferably containing 1 to 19, but especially 1 carbon atom; alternatively $R^2$ is a hydrogen atom; and $R^3$ is preferably a hydrogen atom or a methyl group, with the proviso that the sum of $R^1+R^2+R^3$ ranges from 8 to 19 carbon atoms.

Amongst these nitroarenes, there was found a small group, as yet unknown to the art, which is endowed with a unique combination of useful properties unforeseeable from the properties shown by other nitroarenes. This group of nitroarenes may be represented by Formula I shown above, in which A is an aryl group containing 6 to 7 carbon atoms, $R^1$ is an alkyl group which contains from 14 to 16 carbon atoms, and $R^2$ and $R^3$ are a methyl group or a hydrogen atom.

This small group of nitroarenes distinguish themselves by good compatibility with the resin, low volatility at elevated temperatures and the ability to endow polyvinyl chloride resins with remarkable resistance to soapy water. These attributes make the plasticized polyvinyl chloride resins ideally suited for commercial applications, like in floor coverings, where repeated exposure to water and detergent washings normally tends to extract the plasticizer from the resin.

The alkaryl groups which the $AR^1R^2R^3$ groupings represents are typified by benzene, toluene, xylene (o-, m-, or p-), mesitylene, ethylbenzene, n-propylbenzene, cumene, 1,3,5-triethylbenzene, diphneyl, and the like; presently toluene and benzene are preferred.

The alkyl groups which $R^1$ $R^2$ and $R^3$ represent may be straight or branched; they are typified by the following: methyl, ethyl, isopropyl, t-butyl, isoamyl, 2-ethylhexyl, iso-octyl, iso-nonyl, 2-butyloctyl tetradecyl, pentadecyl, octadecyl, nonadecyl, alkyl residues derived from $C_3$ to $C_{20}$ oxo alcohols, alkyl residues derived from alcohols from the Guerbet's reaction, and the like.

The preparation of the useful nitroalkylarenes may be carried out, in a general manner, by nitration of a suitable alkaryl with a nitrating agent. Generally, the nitro group is introduced by the action of nitric acid admixed with one other acid which preferentially combines with the water in the reaction system. Suitable nitrating agents include:

Nitric acid,
Mixed acids, such as nitric acid admixed with a dehydrating acid such as oleum, sulfuric acid, acetic anhydride, acetic acid, phosphorus pentoxide,
Alkali nitrates in the presence of sulfuric acid,
Organic nitrates, such as acetyl and benzoyl nitrates,
Metal nitrates with acetic acid,
Nitrosulfonic acid,
Nitrogen tetroxide, and the like.

Since the reaction is exothermic, it is desirable to provide cooling means to maintain the temperature in a suitable range, as from about 10° to 80° C., with suitable adjustment for controlling the purity. When nitration is completed, the nitro compound is separated from the layer of spent acid. The nitro compound is then washed and neutralized. The crude product may be purified, as by distillation. General suitable procedures to prepare nitroalkylarenes are further detailed in "Unit Processes in Organic Synthesis," McGraw-Hill Book Company, Inc., in the chapter on "Nitration."

Typical nitroalkylarenes that are employed in accordance with the invention include pentadecylnitrobenzene, octadecylnitrobenzene, nonadecylnitrobenzene, dodecylnitrotoluene, dodecylnitrobenzene, pentadecylnitrotoluene, decylnitronaphthalene, dodecylnaphthalene, n-tetradecylbenzene, and the like.

The nitroalkylarenes are especially valuable plasticizers for polyvinyl halide resins. The term "polyvinyl halide resin" refers to polymers containing a predominant quantity, that is, a quantity greater than 50%, generally over 60%, by weight of the monomer as vinyl halide units. This includes the homopolymers of the vinyl halides as well as the copolymers and interpolymers prepared therefrom with one or more other copolymerizable mono-olefinic monomers. Such copolymerizable secondary monomers include those containing a vinylidene group such as the vinylidene halides like vinylidene chloride; the monomers like the vinyl esters of carboxylic acids, for example, vinyl acetate, vinyl propionate, vinyl butyrate, and vinyl benzoate, and the like; unsaturated acids and the corresponding α-alkyl-substituted unsaturated acids, their alkyl amides, and nitriles like alkyl acrylate, methyl acrylate, ethyl acrylate, propyl acrylate, butyl acrylate, acrylamide, acrylonitrile, and the like; vinyl aromatic compounds such as the styrenes, including styrene, chlorostyrene, ethyl styrene and the like, vinyl naphthalene, alkyl esters of maleic, crotonic, itaconic, fumaric acids, and the like; vinyl alkyl ketones, vinyl pyridine, isobutylene and various other copolymerizable mono-olefinic monomers. The vinylhalide polymer preferably employed is polyvinyl chloride or vinyl chloride copolymers which contain only minor proportions of other copolymerized mono-olefinic monomers, such as copolymers of 50, and preferably 70 to 99 percent, of vinyl chloride and, for example, about 1 to 30 percent of vinylidene chloride, vinyl esters and acrylic acid esters; multi-component interpolymers such as those, for example, containing about 70 to 90 percent vinyl chloride, 5 to 25 percent vinylidene chloride, and 5 to 25 percent vinyl esters such as vinyl acetate, vinyl benzoate and alkyl acrylates or alkyl methacrylates.

In the compounding of the polyvinyl halide resins of this invention, nitroalkylarenes are ordinarily incorporated into the vinyl halide polymers by mixing the powdered resin with the liquid plasticizer followed by mixing and/or kneading and then by curing the mix at an elevated temperature, for example, within the range from 150° to 200° C., on hot rolls or in a heated mixer, such as a Werner-Pfleiderer or Banbury mixer. The proportion of nitroalkylarenes that may be employed may vary over a great range since it is dependent on the particular nitroalkylarenes of this invention which is selected, the specific polyvinyl halide resin to be plasticized, and the final degree of plasticization desired in the resin; this factor in itself being dependent on the ultimate application intended for the resin. With these facts in mind, one skilled in the art may use the nitroalkylarenes in a "plasticizing amount," for most purposes this being from about 5 to 100 parts, and more commonly from 20 to 60 parts, or nitroalkylarenes per 100 parts, and more commonly from 20 to 60 parts, of nitroalkylarenes per 100 parts of resin. In amounts exceeding 100 parts of naphthenate per 100 parts of polyvinyl chloride resin, the nitroalkylarenes of the invention are more commonly suitable for use in organosols and plastisols where some of the more fluid nitroalkylarenes of the invention are useful in imparting the necessary fluidity for preparing semi-rigid polyvinyl chloride coatings.

With the polyvinyl halide resin, there may be incorporated other plasticizers, various stabilizers, filters, dyes, pigments, and the like.

The following examples illustrate the preparation of typical nitroalkylarenes of the invention: all parts are by weight. The color of the product is measured on the Gardner 1933 scale and the viscosity is determined on the Gardner-Holdt scale. The examples are merely illustrative of the invention and are not to be construed to limit its scope.

EXAMPLE 1

Twenty-two parts of pentadecylbenzene is stirred vigorously and maintained at 0° to 5° C. with external cooling while a cooled mixture of 9 parts of concentrated nitric acid and 18 parts of concentrated sulfuric acid is added. With continued stirring, the mixture is allowed to warm to 25° over 3 hours and to remain at 25° to 30° for 3 hours. It is then poured on ice water. The organic material is removed by extraction with benzene, washed with water, dilute sodium hydrogen carbonate solution, again with water, and then distilled. After removal of solvents and a one-part forerun, there is obtained 23 parts of pentadecylnitrobenzene. This product boils at 188° to 210° C. (0.5 mm. Hg) and has $n_D^{25}$ 1.4990, and gives the analysis N, 4.23%. The theoretically required analysis is N, 4.10%. The 23 parts of product represents a yield of 92%.

Other typical nitroalkylarenes of the invention are prepared following the same manipulative steps and by substituting the appropriate alkylarylene and reacting in the presence of concentrated sulfuric and nitric acids. In this manner, there are prepared:

EXAMPLE 2

(a) Octylnitrobenzene is prepared from 0.158 mole of octylbenzene with 38 parts of concentrated sulfuric acid and 19 parts of concentrated nitric acid;

(b) Nonadecylnitrobenzene is prepared from 0.13 mole of nonadecylbenzene with 31 parts of concentrated sulfuric acid and 15.5 parts of concentrated nitric acid;

(c) Dodecylnitrotoluene is prepared from 0.50 mole of dodecyltoluene with 119 parts of concentrated sulfuric acid and 59.5 parts of concentrated nitric acid;

(d) Dodecylnitrobenzene is prepared from 0.50 mole of dodecylbenzene with 119 parts of concentrated sulfuric acid and 59.5 parts of concentrated nitric acid;

(e) Pentadecylnitrobenzene is prepared from 0.39 mole of pentadecylbenzene with 96 parts of concentrated sulfuric acid and 48 parts of concentrated nitric acid;

(f) Pentadecylnitrotoluene is prepared from 0.40 mole of pentadecyltoluene with 96 parts of concentrated sulfuric acid and 48 parts of concentrated nitric acid;

(g) Dodecylnitronaphthalene is prepared from 0.40 mole of dodecylnaphthalene with 96 parts of concentrated sulfuric acid and 48 parts of concentrated nitric acid;

(h) n-tetradecylnitrobenzene is prepared from 0.40 mole of n-tetradecylbenzene with 96 parts of concentrated sulfuric acid and 48 parts of concentrated nitric acid.

The products obtained in Examples 1 and 2 are incorporated in polyvinyl chloride-polyvinyl acetate copolymers in an amount of 40 parts by weight of the compound per 100 parts of resin to give a clear, supple and pliable polyvinyl halide resin film.

The special value of the nitroalkylarenes used in this invention as plasticizers for polyvinyl halide resins is illustrated by the following resinous compositions. No intent to limit the scope of the invention is intended by the illustrations shown. All parts are by weight.

The resinous compositions are made up by blending, in the manner indicated above, the following ingredients in the amounts stated in Table I:

*Table I*

INGREDIENTS OF THE FORMULATIONS

| | Parts |
|---|---|
| Polyvinyl chloride | 60 |
| Plasticizer | 40 |
| Barium cadmium laurate | 1.0 |

The following typical mixed esters are incorporated into the vinyl halide polymer by the procedure described above and the resulting supple films are subjected to the following standard evaluation tests. For purposes of comparison, samples of polyvinyl chloride resins plasticized with di(2-ethylhexyl)phthalate and with butylbenzyl phthalate, two commercially recognized plasticizers, are subjected to the same tests and the results are represented in Table III below.

The tests to which the polyvinyl halide resins are subjected are described below:

TESTS

*Test 1.*—Shore hardness: A Shore "A" durometer, under a weight of 3 pounds, is applied to the test specimens. A recording is made at once and after ten seconds and the hardness is expressed by the two values, of which the first recording is the higher.

*Test 2.*—Activated carbon volatility: 2" squares of weighed specimens are placed between 2-inch layers of activated carbon in sealed glass jars which are maintained at 90° C. for 24 hours. The specimens are removed, dusted free of carbon and reweighed.

*Test 3.*—Torsional modulus at low temperatures: A 2¼ x ¼ sample is cut and mounted in a Tinius-Olsen stiffness tester, which measures the torsional modulus of plastic at various temperatures. The temperature at which a specimen has a torsional modulus of 135,000 lbs./sq. in., known as $T_f$ or $T_{135,000}$ is determined. This roughly corresponds to the "brittle point" obtained by cantilever apparatus.

*Test 4.*—Compatibility: Weighed, conditioned duplicate samples, 4 inches by 4 inches by 0.010 inch, are placed between two sheets of cardboard, which have been conditioned at least 15 hours. The specimens are in contact with the white, coated side of the cardboard. The cardboard specimen sandwiches are placed between 5 inches by 5 inches by 1 inch wood blocks under a 3-kilogram weight. After seven days, the specimens are removed from the stack, conditioned, and reweighed. Percent plasticizer loss is calculated. The cardboard sheets are examined qualitatively for evidence of plasticizer or plasticizing stabilizer stains.

*Test 5.*—Soapy water extraction: 3″ squares of weighed specimens are immersed in a 1% aqueous solution of Ivory soap at 90° C. for 24 hours, after which they are thoroughly washed, dried, and reweighed.

*Test 6.*—Hexane extraction: Weighed samples are immersed in white, lead-free hexane at 25° C. for two hours, after which they are thoroughly dried and reweighed.

The preformance data of the polyvinyl chloride compositions are represented in Table II. Except for the results of Test 1, which are expressed in units of 1 to 100, and the results of Test 3 which are expressed in centigrade, all other results are the amounts expressed as percentage loss of weight of the polyvinyl halide film, the test numbers corresponding to those given above.

*Table II*

KEY OF PLASTICIZERS USED

| Name of compound: | Code number |
|---|---|
| Dodecylnitrotoluene | 1 |
| Dodecylnitrobenzene | 2 |
| Dodecylnitronaphthalene | 3 |
| Pentadecylnitrotoluene | 4 |
| Pentadecylnitrobenzene | 5 |
| Di(2-ethylhexyl)phthalate | 6 |
| Butylbenzylphthalate | 7 |

*Table III*

PERFORMANCE DATA

| Tests | 1 | 2 | 3 | 4 | 5 | 6 |
|---|---|---|---|---|---|---|
| Compounds: | | | | | | |
| 1 | 78 | 22 | −24 | 2.5 | 7.7 | 21.7 |
| 2 | 74 | 23.6 | −24 | 2.7 | 10.1 | 24.6 |
| 3 | 84 | 6.9 | −1.5 | 0.3 | 4.3 | 21.6 |
| 4 | 86 | 13.4 | −24 | 1.4 | 2.7 | 31.5 |
| 5 | 80 | 15.3 | −24 | 1.6 | 1.7 | 31.7 |
| 6 | 70 | 8 | −33 | 0.3 | 9.6 | 28.2 |
| 7 | 67 | 20.3 | −18 | 0.1 | 10.9 | 10.4 |

The data demonstrate that typical nitroarenes give polyvinyl chloride resins of low volatility at elevated temperatures, excellent resistance to soapy water, very satisfactory compatibility and general plasticization properties.

Well-plasticized polyvinyl chloride resins are obtained when the following nitroarenes are blended into polyvinyl chloride:

Dodecylethylnitrobenzene,
Tridecylethylnitrobenzene,
Tetradecylethylnitrobenzene,
Pentadecylethylnitrobenzene,
Dodecylpropylnitrobenzene,
Dodecylisopropylnitrobenzene,
Tridecylisopropylnitrobenzene,
Nonylpropylnitrobenzene,
Nonylisopropylnitrobenzene,
Dodecylnitroxylene,
Tridecylnitroxylene,
Tetradecylnitroxylene,
Pentadecylnitroxylene,
Dinonylnitrobenzene,
Dioctylnitrobenzene,
Dioctylnitrotoluene, and
Dinonylnitrotoluene.

The compositions exhibit improved stability in comparison with polyvinyl chloride plasticized with butylbenzylphthalate, especially at elevated temperatures, and under repeated exposure to detergents and soap in water.

In the above formulations, polyvinyl chloride is replaced by copolymers of (A) 87 parts vinyl chloride
    13 parts vinyl acetate
(B) 80 parts vinyl chloride
    20 parts vinylidene chloride
(C) 80 parts vinyl chloride
    20 parts methyl acrylate
(D) 95 parts vinyl chloride
    5 parts vinyl isobutyl ether The polyvinyl chloride copolymer compositions are tested as described above. The resins exhibit properties comparable to those described above with attendant advantages.

I claim:

1. A plasticized resinous composition comprising a polymer selected from the group consisting of homopolymers of vinyl chloride and copolymers of vinyl chloride with an ethylenically unsaturated monomer copolymerizable therewith, said copolymer containing at least about 60% by weight of vinyl chloride copolymerized therewith, and said plasticized resinous composition having incorporated therein a plasticizing amount of a nitroalkylarene of the formula $$A(NO_2)R^1R^2R^3$$

in which A is an aryl group containing from 6 to 12 carbon atoms, $R^1$ is an alkyl group containing from 8 to 19 carbon atoms, $R^2$ is selected from the group consisting of an alkyl group from 1 to 19 carbon atoms and a hydrogen atom and $R^3$ is selected from the group consisting of a methyl group and a hydrogen atom, the sum of the carbon atoms of the R substituents being from 8 to 19.

2. The plasticized resinous composition of claim 1 in which $R^2$ is an alkyl group containing 1 to 19 carbon atoms and the sum of the carbon atom content of $R^1+R^2+R^3$ ranges from 9 to 19 carbon atoms.

3. The plasticized resinous composition of claim 2 in which $R^2$ is a methyl group.

4. The plasticized resinous composition of claim 2 in which the nitroalkylarene is pentadecylnitrotoluene.

5. The plasticized resinous composition of claim 2 in which the nitroalkylarene is dodecylnitrotoluene.

6. The plasticized resinous composition of claim 2 in which the nitroalkylarene is dodecylnitronaphthalene.

7. The plasticized resinous composition of claim 1 in which the vinyl chloride polymer is a homopolymer of vinyl chloride.

8. The plasticized resinous composition of claim 1 in which the vinyl chloride polymer is a copolymer of vinyl chloride with an ethylenically unsaturated monomer copolymerizable therewith, said copolymer containing at least about 60% by weight of vinyl chloride copolymerized therewith.

9. A plasticized resinous composition comprising a copolymer of at least 85% of vinyl chloride and not more than 15% of vinylidene chloride having intimately incorporated therein a plasticizing amount of the nitroalkylarene of claim 2.

References Cited in the file of this patent

UNITED STATES PATENTS

| | | |
|---|---|---|
| 2,658,925 | Cenker et al. | Nov. 10, 1953 |
| 2,942,994 | Proell et al. | June 28, 1960 |
| 2,948,759 | Wright | Aug. 9, 1960 |